July 22, 1969  R. S. SILVER  3,457,144
MULTI-STAGE FLASH EVAPORATION HAVING PLURAL FEED FLOW PATTERNS
Filed Feb. 3, 1967  2 Sheets-Sheet 1
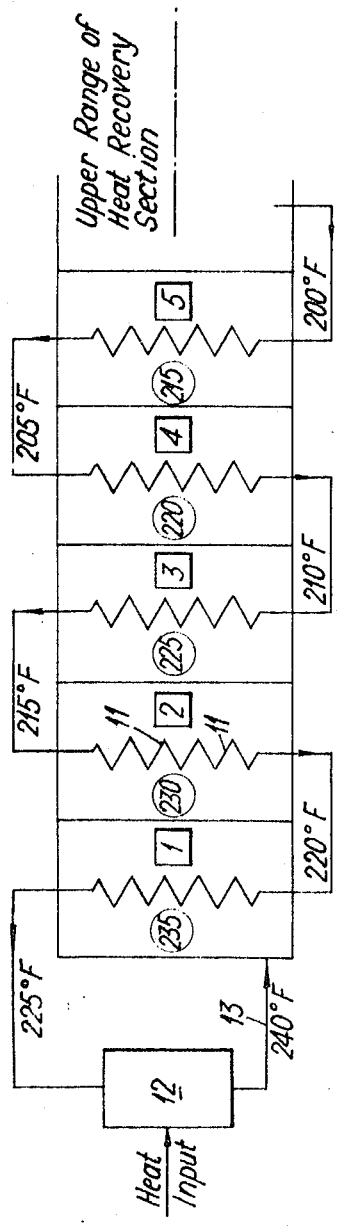
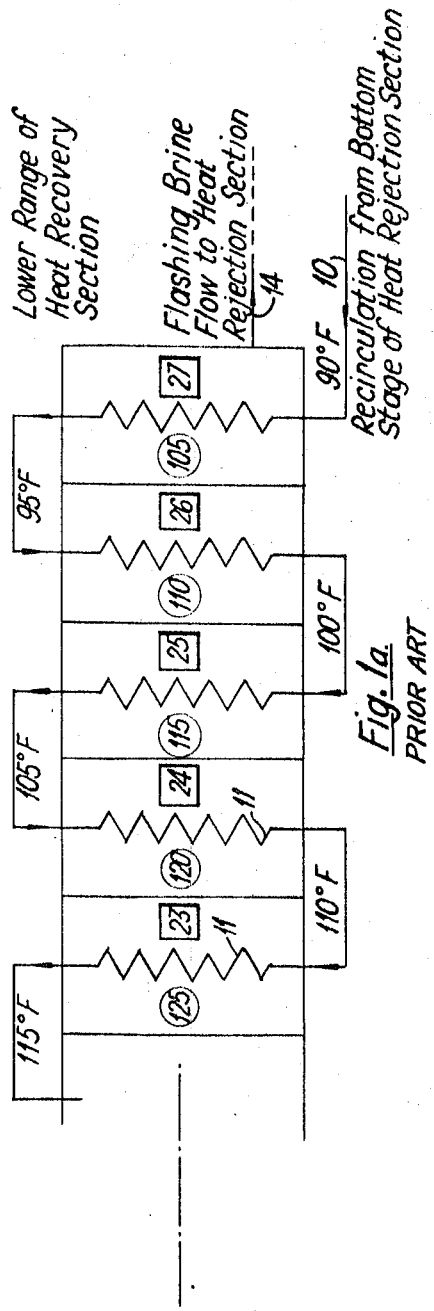
Inventor
ROBERT SIMPSON SILVER
By Mason, Fenwick & Lawrence
Attorneys July 22, 1969 R. S. SILVER 3,457,144
MULTI-STAGE FLASH EVAPORATION HAVING PLURAL FEED FLOW PATTERNS
Filed Feb. 3, 1967 2 Sheets-Sheet 2

Inventor
ROBERT SIMPSON SILVER
By Mason, Fenwick & Lawrence
Attorneys

United States Patent Office 3,457,144
Patented July 22, 1969

3,457,144
MULTI-STAGE FLASH EVAPORATION HAVING
PLURAL FEED FLOW PATTERNS
Robert S. Silver, Glasgow, Scotland, assignor to Weir
Westgarth Limited, Glasgow, Scotland, a corporation
of Great Britain
Filed Feb. 3, 1967, Ser. No. 613,960
Claims priority, application Great Britain, Feb. 3, 1966,
4,730/66
Int. Cl. B01d 3/06
U.S. Cl. 203—22                                    6 Claims

ABSTRACT OF THE DISCLOSURE

A multi-stage evaporator for producing a distillate from a liquid, includes a recovery section comprising a plurality of stages in series fluid communication for passage therethrough of heated feed liquid, each stage having a flash chamber and a heat exchanger located in the flash chamber, means for feeding to said stages a flow of liquid to be heated, means for dividing said flow into at least two separate streams, means for feeding said separate streams in sequence to different stages of the recovery section, means for returning liquid heated to a required temperature the flash chambers to flow past the flow of liquid being heated and partly to flash into vapour in said chambers where the vapour condenses as a liquid distillate, and means for collecting said distillate.

---

This invention relates to an improved multiple-stage evaporator of the kind in which liquid, such as brine, from which a distillate, such as fresh water, is to be distilled first passes to be heated through a heater in the form of a tubular heat exchanger located in a flash chamber in each of a plurality of stages of a recovery section of the evaporator and, after being heated to the required temperature, returns to the flash chambers to flow counter to our transversely of the flow of liquid being heated, and partly flashes into vapour in said chambers, the vapour part being condensed therein as a liquid distillate. Such an evaporator will be termed hereinafter as an evaporator of the kind referred to.

It was customary, heretofore, to cause the liquid to flow through the heaters in the stages in sequence, the weight rate of liquid flowing through the heater in each stage being equal to the weight rate of liquid and distillate flowing through the associated flash chamber, so that the rise in temperature of liquid flowing through the heater in one stage was equal to the drop in temperature between said one stage and the succeeding stage.

An object of the present invention is to provide for an increase in the rise of temperature of liquid flowing through each stage as compared with that obtainable in known evaporators of the kind referred to.

According to the invention, in an evaporator of the kind referred to means is provided for causing the flow of liquid to be heated to divide before entering the first stage into at least two separate streams which are fed in sequence to separate stages of the evaporator.

Thus, considering the case where the flow of liquid is divided into two streams A and B, the stream A will pass through the heaters in alternate stages $r$, $r+2$, $r+4$ etc., while the stream B will pass through the heaters in alternate stages $r+1$, $r+3$, $r+5$ etc. Preferably, each stream will contain half the total quantity of flow. In the case where the flow is divided into three streams, each stream would contain one third of the quantity of flow and would leap frog two stages instead of one as in the case of two streams. This leap frogging action is characteristic of the invention.

The several streams ultimately pass through a common heat input section and emerge as one stream which passes to the flash chambers in the normal manner of existing evaporators of the kind referred to.

One embodiment of the invention will be described by way of example only with reference to the accompanying drawings in which:

FIG. 1a is a flow diagram showing portions of the recovery section and FIG. 1b is a flow diagram of the heat input section of a known evaporator of the kind referred to. FIGURES 1a and 1b hereafter are referred to collectively as FIG. 1.

FIGURES 2a and 2b hereafter referred to collectively as FIG. 2.

Figure 2A:
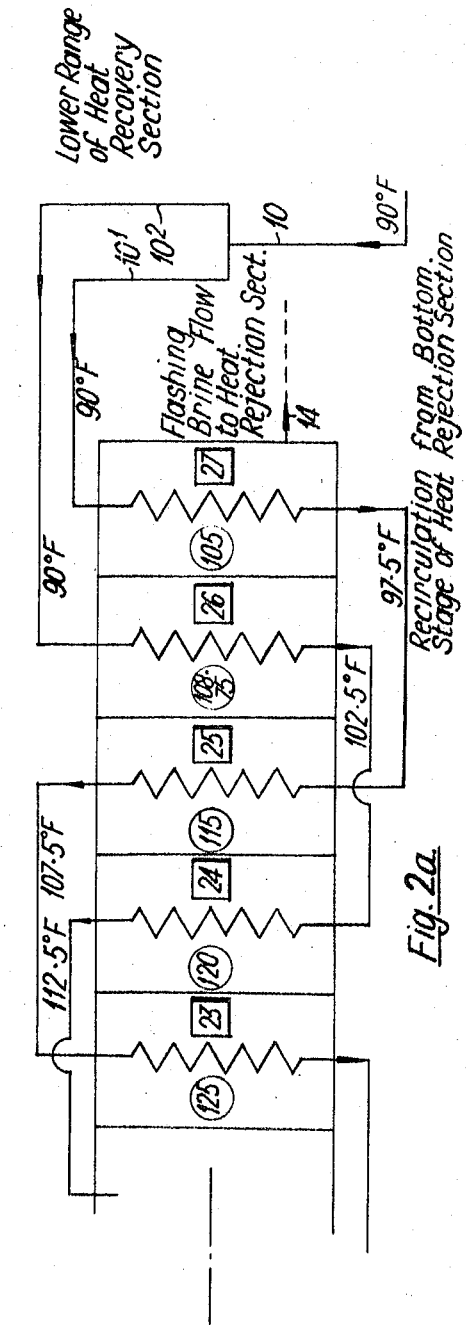
FIG. 2a is a flow diagram showing portions of the recovery section and FIG. 2b is a flow diagram of the heat input section of an evaporator according to the invention.

Referring to both drawings, each evaporator is of the kind in which liquid, such as brine, from which a distillate, such as fresh water, is to be distilled first passes from an inlet connection 10 to be heated in a heater 11 in the form of a tubular heat exchanger located in flash chamber in each of a plurality of stages of a recovery section of the evaporator and, after being heated in a heat input section 12 to the required temperature, returns through a connection 13 to the flash chambers to flow transversely of the flow of liquid being heated in the heaters 11, and partly flashes into vapour in said chambers, the vapour part being condensed therein as a liquid distillate which is fed through a connection 14 to a heat rejection section.

For the purposes of illustration some typical temperatures are indicated. The number of the stage in each figure is indicated by a figure enclosed in a square 1 to 5 and 23 to 27, the temperature of the vapour and flashing liquid system in a particular stage is indicated by a figure enclosed in a circle, and the temperature to which the liquid is heated after passing through the heater 11 in each stage is indicated outside the stage.

In accordance with the invention, the flow of feed liquid to be heated from the connection 10 is divided into two streams, to flow through connections $10^1$, $10^2$ through alternate stages 27, 25, 23—5, 3 and 1, and 26, 24—4 and 2 respectively. It will be seen that whereas the temperature rise of the liquid flowing through the heater of each stage was 5° F. in the known evaporator (FIG. 1), it is 10° F. in all except the stages 26 and 27 of the evaporator shown in FIG. 2. This is because only half the amount of liquid is flowing through the heater in the stage, while the same total quantity of liquid is flashing into vapour in the stage. This doubling of the rise in temperature means that the length of the tubes of each heater must be rather more than double the length of the tubes of each heater of the known evaporator, and thus, where these tubes span the width of an evaporator, the width of the evaporator is conveniently made greater, being at least doubled as compared with the width of a known evaporator (FIG. 1) for the same conditions.

It will also be understood that since only half the quantity of liquid to be heated flows through each stage, only half the number of tubes will be required, so that the number of tube holes is halved, and the tube plate size is halved.

Figure 2B:
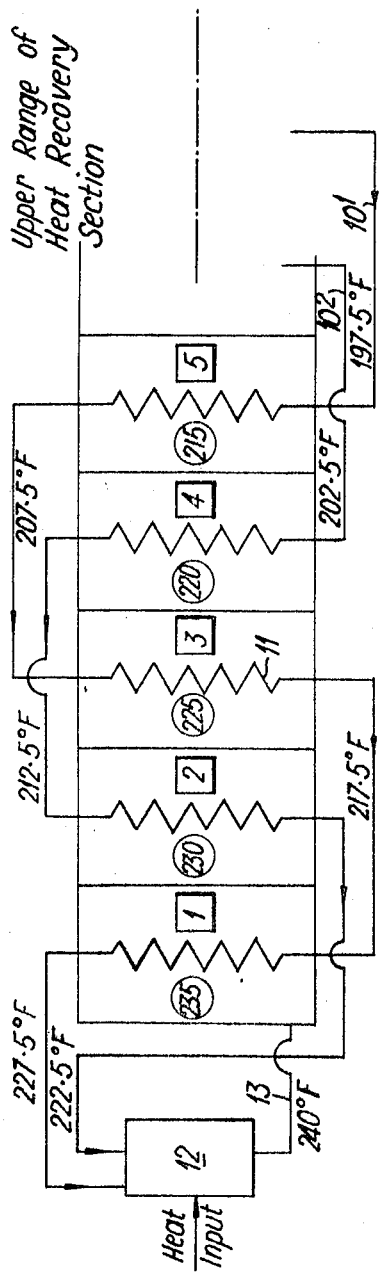

Stages 26 and 27 of the recovery section shown in FIG. 2 are designed with slightly different flash loads and thus slightly different temperature rises of liquid flowing through these two stages, so as to start the temperature difference between the two streams which just after being divided are necessarily of the same temperature.

The temperatures are only illustrative of how the evaporator of the invention operates. The number of heat recovery stages, given as 27 in the example, is also only illustrative. There may be fewer stages or more stages.

The invention consists essentially in the division of flow of liquid to be heated, and in the arrangement by which the separate branches of flow so obtained are given to separate sets of stages. The actual temperatures are a matter of skilled choice for particular purposes.

The heat rejection section of the plant may be constructed in any manner.

Apart from providing for an increased rise in temperature of liquid heated in each stage as compared with that obtained in a known evaporator, the invention also has the following advantages:

(1) A substantial reduction in the number of tubes required in the heat exchangers is effected.

(2) A substantial increase in the length of the required tubes is provided for. This increase in length has a considerable practical utility in relation to the capacity obtainable in such an evaporator.

(3) The number of reversals of flow to which the liquid is subjected is substantially reduced.

(4) The size of the tube plate required for each heat exchanger is substantially reduced, thereby facilitating construction of the evaporator.

(5) The number of tube holes required to be drilled in the tube plates is substantially reduced.

I claim:

1. A multi-stage evaporator for producing a distillate from a liquid, including a multiplicity of flash chambers in series fluid communication; a heat exchanger in each flash chamber for flow of feed liquid therethrough the plurality of heat exchangers being arranged to form a plurality of separate groups of heat exchangers, means connecting the component heat exchangers of each group in series fluid communication with one another; means for dividing the flow of feed liquid into the same number of separate streams as the number of heat exchanger groups; means for passing each stream to a respective different one of said heat exchanger groups whereby no two of said streams flow through the same heat exchanger; means for passing the heated feed liquid emerging from each of said heat exchanger groups collectively and serially back through the flash chambers to first flow through a flash chamber of one group then to flow through a flash chamber of another group to flow past the flow of feed liquid being heated in the heat exchangers; and means for collecting distillate obtained on condensation of the vapour formed on flashing said heat liquid in said flash chambers.

2. An evaporator as claimed in claim 1, in which said streams consist of equal proportions of the total quantity of the flow of liquid to be heated.

3. An evaporator as claimed in claim 1, including a heat input section associated with the last of said heat exchangers, and means for causing said separate streams to flow through said section to emerge therefrom as one stream to pass to the flash chambers.

4. A process of multi-stage evaporation of a feed liquid, comprising the steps:

(a) dividing a flow of feed liquid into a plurality of separate streams;

(b) feeding each of said streams separately through one group of a plurality of groups of heat exchangers, the number of said groups being the same as the number of said separate streams, the component heat exchangers of each group being in series fluid communication and each heat exchanger being arranged in one of a multiplicity of flash chambers, which flash chambers are arranged in series fluid communication, whereby no two of said streams flow through the same heat exchanger;

(c) passing the heated feed liquid emerging from each of said heat exchanger groups collectively and serially back through the said flash chambers alternately from a flash chamber in one group to a flash chamber in another group to flow past the flow of feed liquid being heated in the heat exchangers; and (d) collecting distillate obtained on condensation of the vapour formed on flashing said heated liquid in said flash chambers.

5. A process according to claim 4, in which said flow of feed liquid is divided into equal proportions.

6. A process according to claim 4, in which the streams of heated feed liquid emerging from the heat exchanger groups are passed to a heat input section, combined to form one stream, and the said one stream is passed serially back through the flash chambers.

References Cited

UNITED STATES PATENTS

| | | | |
|---|---|---|---|
| 3,119,752 | 1/1964 | Checkovich | 203—88 X |
| 3,146,177 | 8/1964 | Chalmers et al. | 202—173 X |
| 3,344,041 | 9/1967 | Wulfson | 202—173 X |

WILBUR L. BASCOMB, Jr., Primary Examiner

U.S. Cl. X.R.

159—2; 202—173; 203—11, 71, 88